United States Patent [19]

Szymski et al.

[11] 4,286,696

[45] Sep. 1, 1981

[54] BRAKE FLYWHEEL FOR BICYCLE-TYPE ERGOMETRIC EXERCISER

[75] Inventors: Eugene J. Szymski, Skokie; Rene Mraz, Evanston, both of Ill.

[73] Assignee: Excelsior Fitness Equipment Co., Northbrook, Ill.

[21] Appl. No.: 111,483

[22] Filed: Jan. 14, 1980

[51] Int. Cl.³ .............................................. F16D 65/12
[52] U.S. Cl. ................................. 188/218 A; 272/132
[58] Field of Search ................. 74/574; 188/1 B, 72.3, 188/218 A, 218 XL; 272/73, 132

[56] References Cited

U.S. PATENT DOCUMENTS 3,495,475  2/1970  Rumsey .......................... 188/1 B X

FOREIGN PATENT DOCUMENTS 1395908  5/1975  United Kingdom ................ 188/218 A Primary Examiner—Duane A. Reger

[57] ABSTRACT

In a bicycle-type ergometric exerciser, a brake flywheel comprising two complementally dished stamped metal discs with central hub-receiving apertures and secured together by rivets equally circumferentially spaced around an intermediate portion, with lateral marginal portions providing outer brake surfaces, and opposed inwardly directed peripheral flanges with extruded rubber strips having flange-receiving slots mounted thereon in axially lateral abutting relation to provide a relatively soft outer protective peripheral tire and inner peripheral seats for split steel rings disposed interiorly for inertial weighting.

4 Claims, 3 Drawing Figures

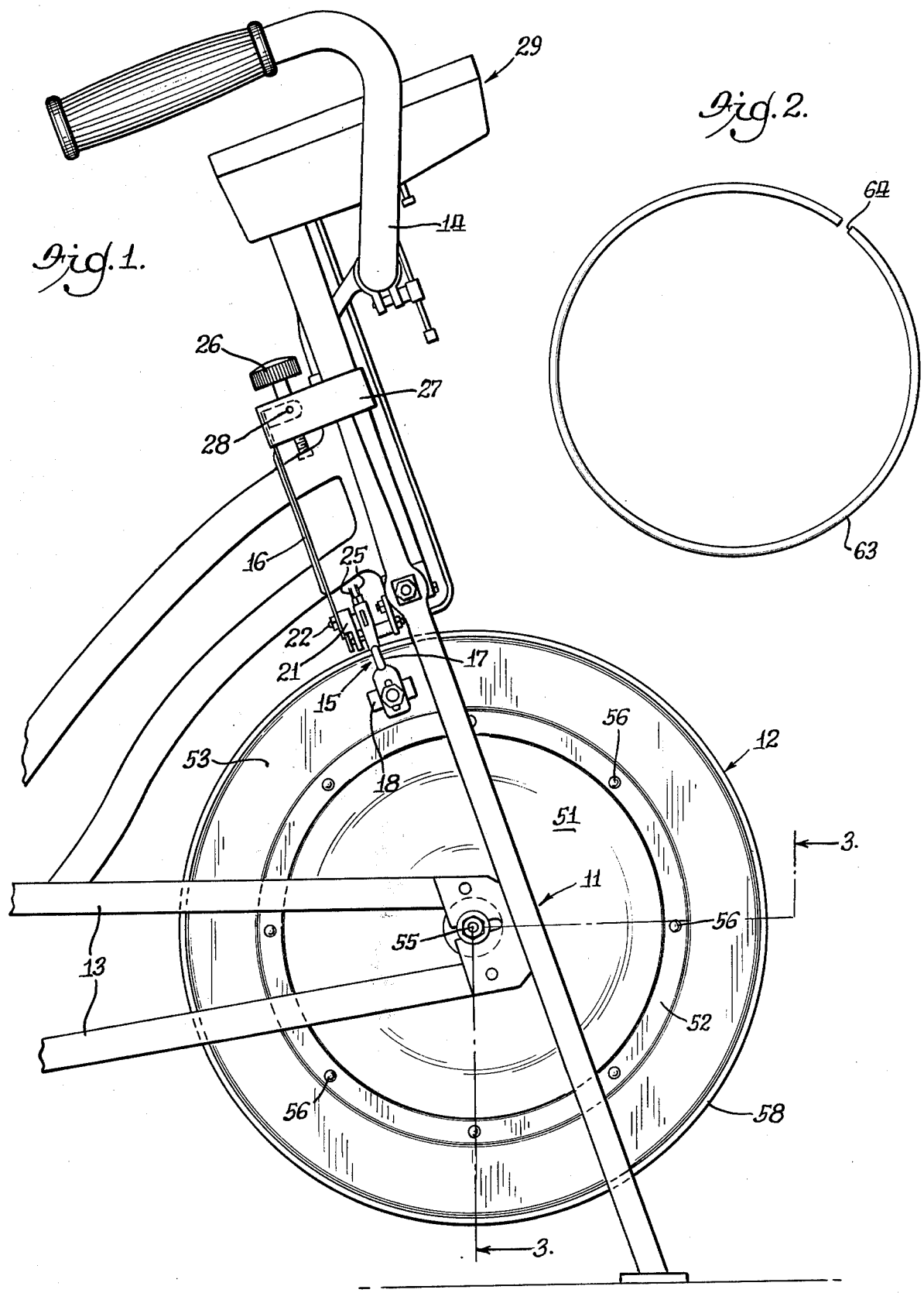

BRAKE FLYWHEEL FOR BICYCLE-TYPE ERGOMETRIC EXERCISER

BACKGROUND OF THE INVENTION

1. Field of the Invention

This invention relates generally to bicycle-type ergometric exercisers, and more particularly to a novel brake flywheel for use therein.

2. Description of the Prior Art

In some bicycle-type exercisers, such as that of the copending application of Brilando and Szymski, Ser. No. 32,242, filed Apr. 20, 1979, a pedal-actuated wheel is employed having lateral marginal brake surfaces engageable by adjustable caliper brakes. In others, a heavy cast metal flywheel is used which cooperates either with a laterally movable brake (Tunturi) or peripherally movable brake means (Monark).

SUMMARY OF THE INVENTION

This invention comprises a brake flywheel for a bicycle-type ergometric exerciser having all of the advantages of such prior cast metal flywheels and which additionally eliminates the expensive machining required with the cast wheels and provides an outer protective peripheral tire by means of two stamped metal discs dished to provide intermediate contacting ring portions secured together, as by riveting, and outer spaced-apart marginal portions having brake surfaces and opposed inwardly directed peripheral flanges, with an extruded rubber strip having a flange-receiving slot mounted on each flange, and a split steel ring disposed within the peripheral portion of each disc for inertially weighting the flywheel, whereby the rubber strips form the outer protective peripheral tire and inner peripheral seats for the steel rings to prevent rattling thereof during flywheel movements. The split steel rings have an unassembled outer diameter greater than the inner diameter of the mounted rubber strips so as to exert radial outward forces against the latter when in the wheel, and rings of different thicknesses may be used to vary the weighting of the wheel.

In the drawings:

FIG. 1 is a side elevation of a bicycle-type ergometric exerciser, with parts omitted for clarity, showing a brake flywheel embodying the features of this invention for use therein;

FIG. 2 is a side elevation of one of the split steel rings for use in the flywheel for inertially weighting the same shown in free or unassembled position.

DESCRIPTION OF THE PREFERRED EMBODIMENT

Figure 3:
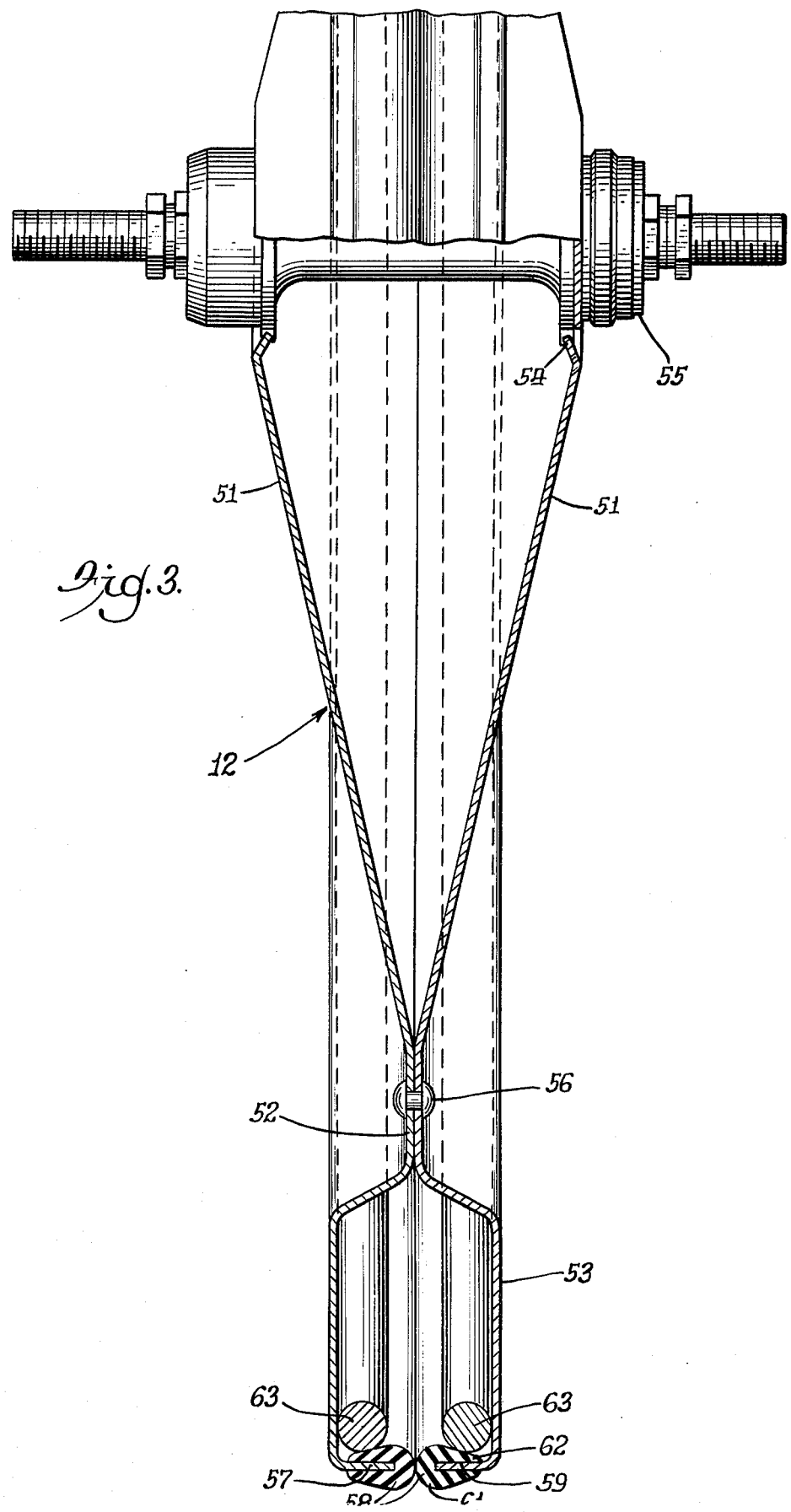
FIG. 3 is a vertical section through the flywheel taken substantially on the line 3—3 of FIG. 1 and shown on an enlarged scale.

In FIG. 1, a bicycle-type ergometric exerciser indicated generally by reference numeral 11 is shown, with some parts omitted for clarity, as including a brake flywheel 12 mounted thereon for rotation in well-known manner by suitable pedal means and a chain extending within the usual guard 13. The exerciser also may include a suitable handlebar 14 and is shown in FIG. 1 as including adjustable brake means indicated generally by reference numeral 15 supported adjacent the lower end of a pivot arm 16 and comprising a pair of caliper brake arms 17 with friction pads 18 on their lower ends engageable with opposite sides of a rim portion of the wheel.

The brake arms 17 are pivotally supported on a stirrup 21 secured adjacent its upper end at 22 to the lower portion of the pivot arm 16 and are adjustably moved to hold their pads 18 in frictional engagement with the wheel by rods 25 actuated by a brake pressure adjusting screw 26 supported by a bracket 27 mounted on the support means for the exerciser 11. The upper end of pivot arm 16 is pivotally supported at 28 in the bracket 27. Consequently, if the wheel 12 is rotated by the operator in a clockwise direction, as viewed in FIG. 1, and the caliper brake means 15 has been adjusted by screw 26 to frictionally engage the wheel, the lower end of arm 16 and the stirrup 21 thereon will be moved to the right in accordance with the work rate input being exerted by the operator. Suitable instrument panel means indicated generally by reference numeral 29 is mounted on the support means 11 at a position centrally of the handlebar 14 to indicate to the operator such work rate input. Such a bicycle-type ergometric exerciser is disclosed in the previously identified copending application Ser. No. 32,242 in which the same reference numerals are used to identify similar parts as heretofore employed herein, except for the wheel 12 which in that prior application comprises an ordinary bicycle wheel.

In the instant case, on the other hand, the wheel 12 comprises an inertially weighted flywheel which is superior to prior cast flywheels for the reasons hereinbefore noted. As best seen in FIG. 3, the flywheel 12 is made up of two circular stamped metal discs 51 dished to provide intermediate contacting ring portions 52, outer spaced-apart marginal portions 53 and inner spaced-apart flange portions 54 defining central apertures for receiving and being suitably secured to a central hub means or assembly 55 of known construction for mounting the flywheel on the support means for the exerciser 11. Means are provided for securing the two intermediate portions 52 together which preferably comprises a plurality of equally circumferentially spaced rivets 56, although any other suitable securing means may be employed. The two discs 51 are identical, being merely laterally reversed, and preferably are stamped from cold rolled steel sheet 0.0598 of an inch thick, with suitable holes at the same time being punched therethrough for the rivets 56.

Opposed inwardly directed peripheral flanges 57 on the marginal portions 53 have an extruded rubber strip 58 mounted thereon by means of a flange-receiving slot 59 in the strip so that when the two discs 51 are secured together, the laterally inner edges of the strips 58 contact each other and their peripheral outer portion 61 provide a protective tire. An inner peripheral portion 62 of each strip provides a resilient seat for a split steel ring 63 that has been mounted in each disc 51 before the two discs are secured together. As shown in FIG. 2, each ring 63 is split laterally at 64 and assumes its unassembled shape as therein illustrated. In being assembled into a disc 51, the ring is contracted to bring the ends formed by the split 64 together and reduce its unassembled outer diameter, which is greater than the inner diameter of the associated strip 58 as mounted on its flange 57, so that the ring exerts a radially outward force against the strip 58 when assembled in the flywheel in attempting to return (as a spring) to its unassembled shape. Thus, the inner peripheral portion 62 of the relatively soft rubber strip 58 provides a seat for the split ring 63 and rattling of the ring during flywheel movement is prevented. In this connection, the slight laterally outward thinning of the inner peripheral portion 62 of the strip 58 as illustrated in FIG. 3 is helpful, but it is not essential.

The split rings 63 preferably are formed from rods of hot rolled low carbon steel. In the preferred embodiment illustrated, the rings 63 are 0.375 of an inch thick, the splits 64 0.12 of an inch wide and the rings have an unassembled outer diameter of 19.12 inches. It will be understood that such specifications may be varied as required to achieve the degree of inertial weighting desired, with a wide range being available merely by using rings of different thickness or transversely sectional diameter. A flywheel 12 as herein disclosed may be used as illustrated in an ergometric exerciser employing caliper brakes, the brake pads 18 cooperating with the brake surfaces provided by the marginal portions 53 of the discs 51, or where only a single brake element is employed, or in an exerciser in which a driven member cooperates directly with the outer tire formed by the rubber strips 58, all with selected inertial weighting equivalent to that of a cast wheel, while at the same time eliminating the disadvantges of the latter hereinbefore noted.

It is thought that the invention will be understood from the foregoing description and it will be apparent that various changes may be made in the form, arrangement and construction of the various parts described without departing from the spirit and scope of the invention or sacrificing all of its material advantages, the form hereinbefore described being merely a preferred embodiment thereof.

The embodiments of the invention in which an exclusive property or privilege is claimed are defined as follows:

1. A brake flywheel for a bicycle-type ergometric exerciser, comprising two stamped metal discs dished to provide intermediate contacting ring portions and outer spaced-apart marginal portions, means for securing said intermediate portions together, opposed inwardly directed peripheral flanges on said marginal portions, an extruded rubber strip having a flange-receiving slot mounted on each said flange, and a steel ring disposed within the peripheral portion of each said disc for rotation therewith for inertially weighting said flywheel, said rubber strips providing inner peripheral seats for said steel rings to prevent rattling thereof during flywheel movements.

2. A brake flywheel according to claim 1, wherein said steel rings are split laterally and have an unassembled outer diameter greater than the inner diameter of said mounted rubber strips so as to exert radially outward forces against said strips when assembled in said flywheel.

3. A brake flywheel for a bicycle-type ergometric exerciser having pedal actuating means, comprising two stamped metal discs dished to provide intermediate contacting ring portions and having central apertures for receiving hub means for rotation by said pedal actuating means, means for securing said intermediate portions together, opposed inwardly directed peripheral flanges on said discs, an extruded rubber strip having a flange-receiving slot mounted on each said flange, and a split steel ring disposed within the peripheral portion of each said disc for inertially weighting said flywheel, said rubber strips providing an outer tire and inner peripheral seats for said steel rings to prevent rattling thereof during flywheel rotation.

4. A brake flywheel for a bicycle-type ergometric exerciser having laterally opposed caliper brakes, comprising two stamped metal discs dished to provide intermediate contacting ring portions and outer spaced-apart marginal portion providing brake surfaces engageable by said caliper brakes, means for securing said intermediate portions together, opposed inwardly directed peripheral flanges on said marginal portions, an extruded rubber strip having a flange-receiving slot mounted on each said flange, and a split steel ring disposed within the peripheral portion of each said disc for inertially weighting said flywheel, said rubber strips providing an outer protective peripheral tire and inner peripheral seats for said steel rings to prevent rattling thereof during flywheel movements.

* * * * *